US012652505B2

(12) United States Patent　　(10) Patent No.:　US 12,652,505 B2

Montanari et al.　　(45) Date of Patent:　Jun. 9, 2026

(54) DETERMINATION OF SEAL QUALITY

(71) Applicant: Omnibuds Ltd, Cambridge (GB)

(72) Inventors: Alessandro Montanari, Cambridge (GB); Hoang Truong, Boulder, CO (US)

(73) Assignee: Omnibuds Ltd, Cambridge (GB)

( * ) Notice: Subject to any disclaimer, the term of this patent is extended or adjusted under 35 U.S.C. 154(b) by 482 days.

(21) Appl. No.: 18/180,091

(22) Filed: Mar. 7, 2023

(65) Prior Publication Data

US 2023/0292069 A1　　Sep. 14, 2023

(30) Foreign Application Priority Data

Mar. 9, 2022　(EP) ..................................... 22160960

(51) Int. Cl.
| | |
|---|---|
| *H04R 1/10* | (2026.01) |
| *G05B 19/416* | (2006.01) |
| *G05D 16/20* | (2006.01) |
| *H04R 29/00* | (2006.01) |

(52) U.S. Cl.
CPC ........... *H04R 29/00* (2013.01); *G05B 19/416* (2013.01); *G05D 16/2013* (2013.01); *H04R 1/1016* (2013.01); *H04R 1/1041* (2013.01); *G05B 2219/45006* (2013.01); *H04R 2460/11* (2013.01)

(58) Field of Classification Search
CPC .............................. H04R 29/00; H04R 1/1016
See application file for complete search history.

(56) References Cited

U.S. PATENT DOCUMENTS

| | | | |
|---|---|---|---|
| 5,819,745 A | 10/1998 | Mobley et al. | |
| 6,754,359 B1 * | 6/2004 | Svean .................. | H04R 1/1083 |
| | | | 381/313 |
| 8,059,847 B2 | 11/2011 | Nordahn | |
| 8,098,838 B2 | 1/2012 | Lee et al. | |
| 8,401,200 B2 | 3/2013 | Tiscareno et al. | |
| 8,737,635 B2 | 5/2014 | Ambrose et al. | |
| 8,983,083 B2 | 3/2015 | Tiscareno et al. | |
| 9,282,412 B2 | 3/2016 | Duisters | |
| 9,609,449 B1 * | 3/2017 | Mäenpää ............... | G01H 11/06 |

(Continued)

FOREIGN PATENT DOCUMENTS

| | | |
|---|---|---|
| CN | 113613131 A | 11/2021 |

OTHER PUBLICATIONS

Gao et al., "EarEcho: Using ear canal echo for wearable authentication", Proceedings of the ACM on Interactive, Mobile, Wearable and Ubiquitous Technologies, vol. 3, No. 3, Article No. 81, 2019, pp. 1-24.

(Continued)

*Primary Examiner* — Mark A Connolly

(74) *Attorney, Agent, or Firm* — Venable LLP

(57) ABSTRACT

An apparatus, method and computer program is described for: receiving, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal; determining one or more characteristics of the signal; and determining a measure of a quality of a seal between the earpiece and the ear canal based on the one or more characteristics.

16 Claims, 8 Drawing Sheets

100

(56) References Cited

U.S. PATENT DOCUMENTS

| | | | |
|---|---|---|---|
| 10,299,053 | B2 | 5/2019 | Usher et al. |
| 10,491,981 | B1 | 11/2019 | Wang et al. |
| 10,937,410 | B1 | 3/2021 | Rule |
| 2009/0122996 | A1 | 5/2009 | Klein et al. |
| 2016/0249128 | A1* | 8/2016 | Goldstein ............ H04R 1/1016 |
| 2017/0026732 | A1* | 1/2017 | Kirsch ................. H04R 1/1041 |
| 2017/0214994 | A1 | 7/2017 | Gadonniex et al. |
| 2018/0242069 | A1* | 8/2018 | Hviid ........................ H04R 1/04 |
| 2018/0295439 | A1* | 10/2018 | Garrett ................. H04R 1/1016 |
| 2020/0162808 | A1 | 5/2020 | Monsarrat-Chanon et al. |
| 2021/0014597 | A1* | 1/2021 | Andersen ................. H04R 3/04 |
| 2021/0051389 | A1 | 2/2021 | Barnacka et al. |
| 2021/0092536 | A1 | 3/2021 | Roeck et al. |
| 2023/0133906 | A1* | 5/2023 | Kamimura ........... H04R 25/658 |
| | | | 381/328 |
| 2023/0224633 | A1* | 7/2023 | Keady ................. H04R 1/1041 |
| | | | 381/56 |
| 2024/0107247 | A1* | 3/2024 | Terlizzi ................ H04R 29/001 |

OTHER PUBLICATIONS

Wang et al., "EarDynamic: An Ear Canal Deformation Based Continuous User Authentication Using In-Ear Wearables", Proceedings of the ACM on Interactive, Mobile, Wearable and Ubiquitous Technologies, vol. 5, No. 1, Article No. 39, 2021, pp. 1-27.

Martin et al., "In-ear audio wearable: Measurement of heart and breathing rates for health and safety monitoring", IEEE Transactions on Biomedical Engineering, vol. 65, No. 6, Jun. 2018, pp. 1256-1263.

Bouserhal et al., "Classification of Nonverbal Human Produced Audio Events: A Pilot Study", Interspeech, 2018, pp. 1512-1516.

Vaidyanathan et al., "Tongue-movement communication and control concept for hands-free human-machine interfaces", IEEE Transactions on Systems, Man, and Cybernetics—Part A: Systems and Humans, vol. 37, No. 4, Jul. 2007, pp. 533-546.

"Choose your AirPods Pro ear tips and use the Ear Tip Fit Test", Apple Support, Retrieved on May 2, 2023, Webpage available at : https://support.apple.com/en-us/HT210633.

"AirPods Pro (2nd generation)—Technical Specifications", Apple (UK), Retrieved on May 2, 2023, Webpage available at : https://www.apple.com/uk/airpods-pro/specs/.

"AirPods Pro Deep Dive Teardown | Hifigo", HiFiGo, Retrieved on May 2, 2023, Webpage available at : https://hifigo.com/blogs/review/airpods-pro-deep-dive-teardown-hifigo.

Tuyls et al., "Privacy protected biometric templates: Acoustic ear identification", Biometric Technology for Human Identification, vol. 5404, 2004, pp. 176-182.

Carioli et al., "Piezoelectric Earcanal Bending Sensor", IEEE Sensors Journal, vol. 18, No. 5, Mar. 1, 2018, pp. 2060-2067.

Extended European Search Report received for corresponding European Patent Application No. 22160960.5, dated Sep. 12, 2022, 9 pages.

* cited by examiner

100

104

102

106    108

602

604

606

608

610

602

604

606

DETERMINATION OF SEAL QUALITY

FIELD

Example embodiments may relate to apparatus, methods and/or computer programs for determining seal quality, in particular for determining a quality of a seal of in-ear earpieces with a user's ear canal.

BACKGROUND

Given the high variability of human ear shapes, it is challenging for earbud, earphone or other earpiece manufacturers to design earpieces that result in a good seal for each user. For some earpieces, ear tips may be provided to try and improve the seal. In the case of earphones or earbuds, users may try mulear tiple ear tips from different manufacturers until they find the ear tips that provide the best seal. However, this assessment is subjective, guided by a user's perception and feeling. Attempts have been made to try and ensure a good seal by mechanical means, such as by inflating an ear tip or another part of the earpiece which is inserted into the ear canal. These systems might be uncomfortable for the user (who might feel pain during the inflation process), and are complex to implement and manufacture. The presence of such mechanical means also increases the size and power consumption of the earpiece, and the use of moving parts increases the risk of device failure.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: receiving, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal; determining one or more characteristics of the signal; and determining a measure of a quality of a seal between the earpiece and the ear canal based on the one or more characteristics.

Rather than merely determining whether an earpiece is currently being worn or not, the approach described herein allows to determine a quality of a fit of an earpiece, and how good a seal is being formed between the earpiece and a user's ear canal. Determining a measure of a quality of seal based on pressure within the ear canal facilitates effective, repeatable determination of a quality of a seal in an unobtrusive manner. The seal quality can also be determined without the need for a specific test signal. Moreover, relying on pressure signal(s) instead of, for example, one or more audio signals indicative of noise inside the ear canal and/or speaker impendence measurements, can facilitate a reduction in the use of computational and processing resources when determining a measure of a quality of a seal.

In some examples, the means for receiving the signal from the pressure sensor comprises: means for receiving the signal from the pressure sensor at a predetermined sampling rate over the period of time; or means for receiving the signal from the pressure sensor continuously over the period of time.

In some examples, the one or more characteristics comprise at least one of: a maximum value of the signal; a gradient of the signal over one or more portions of the period of time; a ratio between the maximum value and an external reference signal; a standard deviation of the signal; a variance of the signal; and a minimum value of the signal. In some examples, the external reference signal comprises an ambient pressure measured by the pressure sensor prior to insertion of the ear tip into the ear canal.

In some examples, the gradient of the signal comprises the gradient of the signal subsequent to the maximum value of the signal. By using the gradient of the pressure signal, rather than just comparing a measured value of the pressure to a threshold, a more robust determination of the measure of the quality of the seal can be determined. For example, a measured pressure may depend on a shape of a user's ear canal and/or environmental parameters, and/or an activity being performed by a user. Considering a change in the pressure signal over time can therefore facilitate a robust determination of the seal quality under a range of different conditions.

Some examples include means for weighting each of the one or more characteristics. In some examples, the means for determining the measure of the quality of the seal comprises means for determining the measure of the quality of the seal based on the weighted one or more characteristics.

Some examples include means for controlling opening of a pressure equalizer valve of the earpiece, the controlling based on the measure of the quality of the seal satisfying one or more predetermined criteria. By providing means for controlling (or delaying) opening of the valve until the measure of the quality of the seal satisfies one or more predetermined criteria, effective determination of a measure of the quality of the seal may be facilitated.

Some examples include means for controlling the pressure equalizer valve to adjust pressure within the ear canal to a target pressure greater than an ambient environmental pressure.

Some examples include means for periodically receiving an updated signal from the pressure sensor. Some examples include means for updating the measure of the quality of the seal based on the updated signal.

Some examples include means for determining a trigger event indicative of an initiation of insertion of the ear tip into the ear canal, the trigger event determined based on a second signal from a second sensor associated with the earpiece. In some examples, the means for receiving the signal from the pressure sensor comprises means for receiving the signal from the pressure sensor in response to determining the trigger event. In some examples, the second sensor comprises an IMU and/or a proximity sensor.

Some examples include means for performing an action in response to determining the measure of the quality of the seal, the action comprising one or more of: providing output to the user via the earpiece; enabling or disabling one or more features associated with operation of the earpiece; or authenticating the user.

The means may comprise: at least one processor; and at least one memory including computer program code, the at least one memory and the computer program code configured, with the at least one processor, to cause the performance of the apparatus.

According to a second aspect, there is described a method comprising: receiving, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal; determining one or more characteristics of the signal over the period of time; and determining a measure of a quality of a seal between the earpiece and the ear canal based on the one or more characteristics.

In some examples, the method further comprises performing an action in response to determining the measure of the quality of the seal, the action comprising one or more of: providing output to the user via the earpiece; enabling or disabling one or more features associated with operation of the earpiece; or authenticating the user.

Example embodiments of the apparatus may also provide any other feature of the method of the second aspect.

According to a third aspect, this specification describes a computer program comprising instructions for causing an apparatus to perform at least: receiving, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal; determining one or more characteristics of the signal over the period of time; and determining a measure of a quality of a seal between the earpiece and the ear canal based on the one or more characteristics.

Example embodiments of the third aspect may also provide any feature of the second aspect.

According to a fourth aspect, this specification describes a computer-readable medium (such as a non-transitory computer-readable medium) comprising program instructions stored thereon for performing at least the following: receiving, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal; determining one or more characteristics of the signal over the period of time; and determining a measure of a quality of a seal between the earpiece and the ear canal based on the one or more characteristics.

According to a fifth aspect, this specification describes an apparatus comprising: at least one processor; and at least one memory including computer program code which, when executed by the at least one processor, causes the apparatus to: receive, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal; determine one or more characteristics of the signal over the period of time; and determine a measure of a quality of a seal between the earpiece and the ear canal based on the one or more characteristics.

In a sixth aspect, this specification describes an apparatus comprising: a first receiving module configured to receive, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal; a first determining module configured to determine one or more characteristics of the signal over the period of time; and a second determining module configured to determine a measure of a quality of a seal between the earpiece and the ear canal based on the one or more characteristics.

In a seventh aspect, this specification describes an earpiece comprising a pressure sensor. The earpiece may be configured to perform any method as described with reference to the second aspect, or the earpiece may be in communication with an apparatus of any aspect described herein. In some examples, an earpiece comprising an ear tip configured for insertion into an ear canal of a user is described, the earpiece further comprising the pressure sensor; and the apparatus of any preceding claim.

BRIEF DESCRIPTION OF THE DRAWINGS

Example embodiments will now be described, by way of example only, with reference to the following schematic drawings, in which.

In the description and drawings, like reference numerals refer to like elements throughout.

DETAILED DESCRIPTION

It is challenging for earpiece manufacturers to design earpieces that result in a good seal for each user. Assessment of a quality of a seal has typically been subjective, or has required active initiation of a seal quality test by a device and/or a user.

Figure 1:
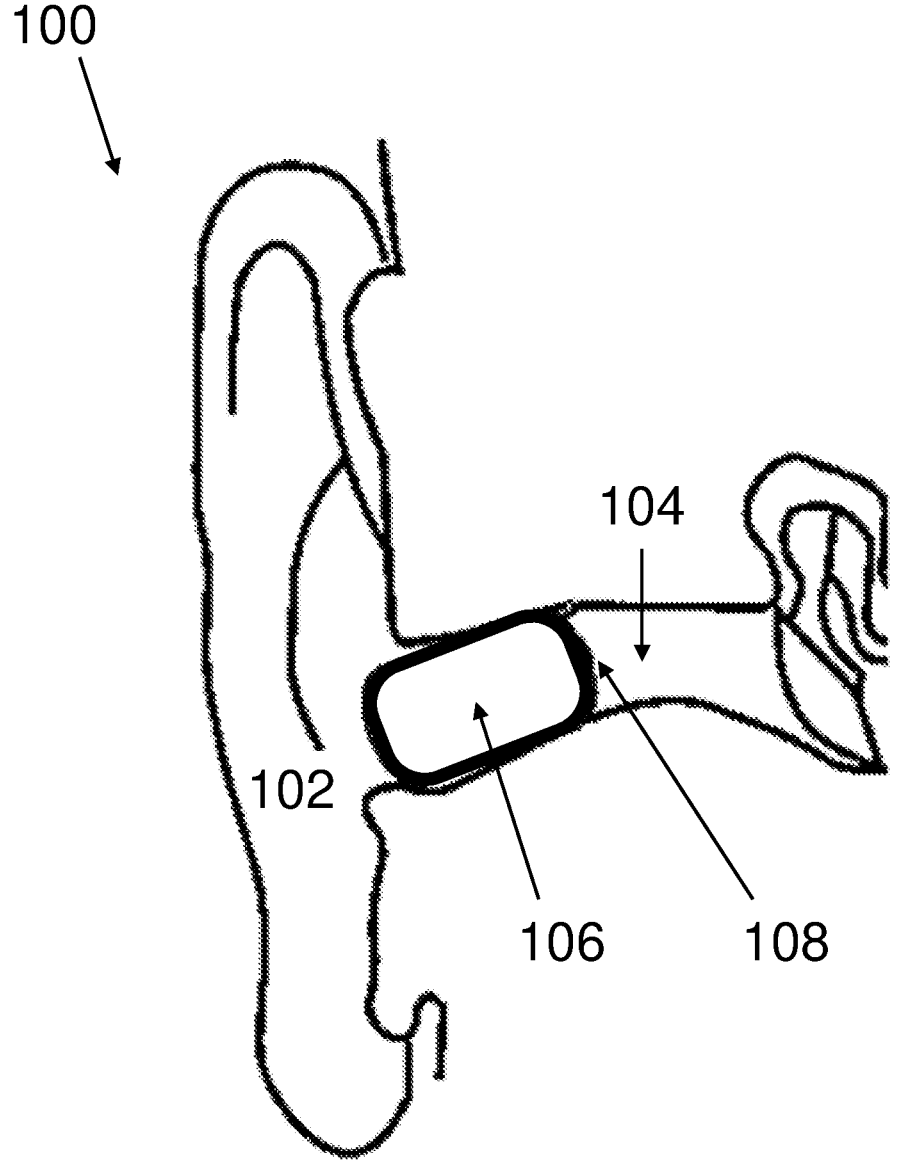
FIG. 1 is a schematic of an example environment of an apparatus for determining a seal quality.

With reference to FIG. 1, an example environment for an apparatus configured to determine a (measure of a) quality of a seal objectively and unobtrusively, in a simple, repeatable, way, and without active user initiation is described. In particular, an ear 102 of a user 100 is shown, the ear 102 comprising an ear canal 104.

An earpiece 106 is configured to be worn by the user. In the example of FIG. 1, the earpiece 106 is substantially inserted into the ear canal 104, but other arrangements are possible. For example, at least part of earpiece 106 may sit outside of the ear canal 104, such as on the concha of the ear. In other examples, earpiece 106 may comprise a loop or hook configured to sit over the ear 102. The earpiece 106 can be an earbud or earphone/in-ear monitor (IEM), or any other device configured to be worn in, or at least partly inserted into, the ear 102 of a user, such as a hearing aid, etc. The earpiece may also be a part of an instrument or device that is configured to be inserted into the ear 102, such as a stethoscope.

The earpiece 106 comprises an ear tip 108, which is configured to be inserted into the ear canal 104. The ear tip 108 can be integral with the earpiece (i.e. may be the end part or portion of the earpiece), or may be a separate component configured to couple to the earpiece 106. In some examples, the ear tip 108 can be an ear tip formed of rubber and/or silicone and/or foam, or formed of any other suitable material for aiding comfort and helping to create a seal with the ear 102. Such ear tips may be removably coupled to earphones, IEMs, earbuds, or a stethoscope (or to any other earpiece 106), or may be formed integral with the earpiece 106.

When the ear tip 108 is inserted into the ear canal 104 and begins to occlude the ear canal, a pressure is increased within the ear canal 104 as a result of the insertion. The pressure increases until a user stops inserting the earpiece 106. The amount of pressure increase within the ear canal 104 depends on the environmental, ambient, pressure, as well as on other factors such as how quickly and/or force-fully the ear tip 108 is inserted into the ear canal 104. It has been recognised that this pressure increase within the ear canal can be used to determine an objective measure of a quality of a seal formed between the earpiece 106 and the ear canal 104 in a passive, unobtrusive, manner.

Figure 2A:
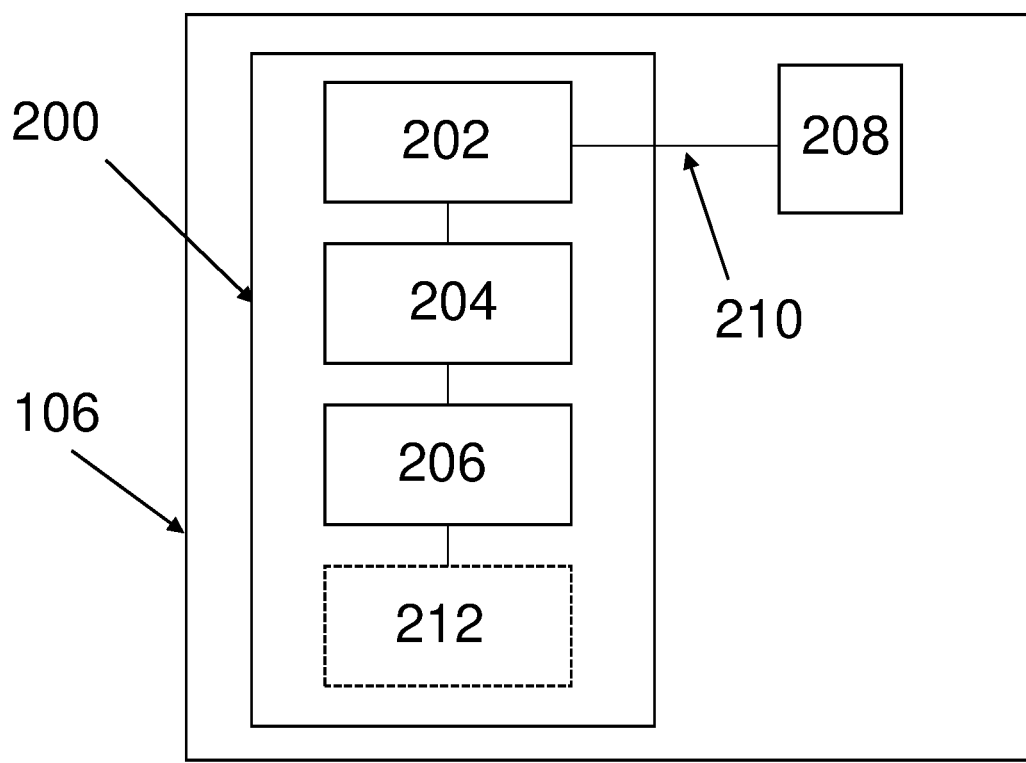
FIGS. 2A and 2B are block diagrams of example components of an apparatus for determining a seal quality.
Figure 2B:
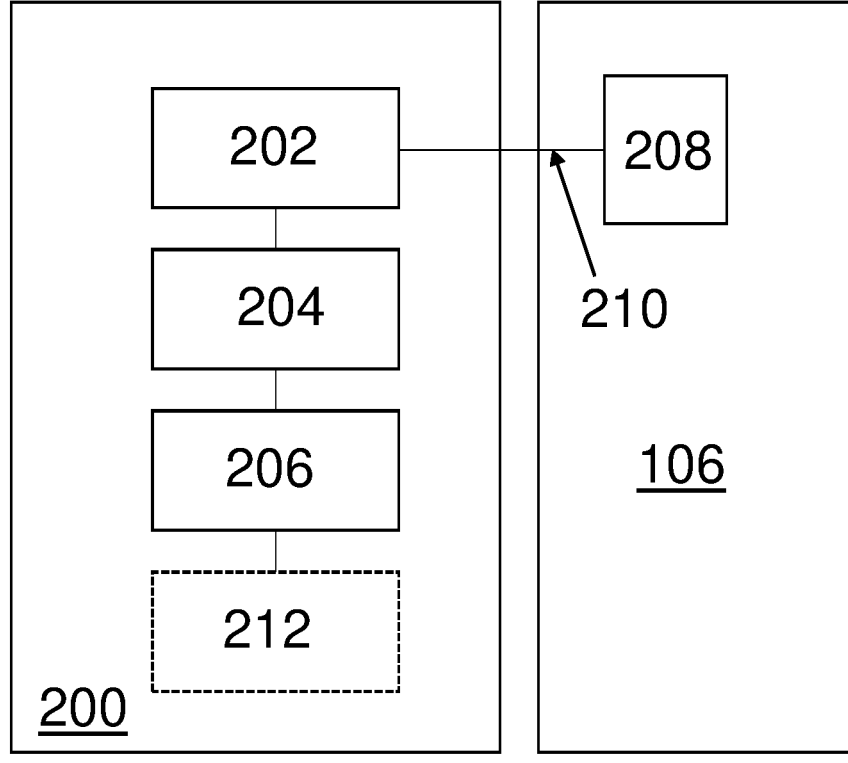

With reference to FIG. 2A and FIG. 2B, an apparatus 200 for determining a measure of a quality of a seal formed by an earpiece is described. Apparatus 200 may comprise at least one processor; and at least one memory including computer program code which, when executed by the at least one processor, cause the apparatus to perform the operations described herein.

Apparatus 200 comprises means for receiving 202, over a period of time, a signal indicative of a pressure measured by a pressure sensor 208 of an earpiece, such as earpiece 106 described above. Means 202 may also be referred to as a first receiving module 202. The signal can be received directly from the pressure sensor 208 via connection 210, or may be received indirectly from the pressure sensor 208 via con-nection 210 and by way of one or more intermediary processors, controllers, or other components (not shown here). For example, the signal may be received from pres-sure sensor 208 by way of a microprocessor, or a micro-controller or microcontroller unit (MCU).

Connection 210 can be a wired connection or a wireless connection, as appropriate. In other words, the signal can be received using any suitable communication protocol, and over any suitable connection or network arrangement. For example, wireless embodiments may be deployed in 2G/3G/4G/5G networks and further generations of 3GPP, but also in non-3GPP radio networks such as WiFi. Embodiments may also use Bluetooth, for example. Names of network elements, protocols, and methods are based on current standards. In other versions or other technologies, the names of these network elements and/or protocols and/or methods may be different, as long as they provide a corresponding functionality.

As shown in FIG. 2A and FIG. 2B, the pressure sensor is integral with the earpiece 106 (i.e. is provided within the earpiece). The pressure sensor 208 is arranged to measure a pressure within the ear canal 104 when the ear tip 108 is inserted into the ear canal. To that end, the pressure sensor 208 can be arranged at or proximate to the ear tip 108 of the earpiece 106, or at any other suitable location on or in earpiece 106 to facilitate measurement, by the pressure sensor 208, of a pressure within the ear canal 104 when the ear tip 108 is inserted into the ear canal 104. For example, a pressure sensor 208 can be provided inside a portion of the ear tip 108 of the earpiece 106 which is configured to be inserted into the ear canal 104 when the earpiece is in use by a user 100.

Pressure sensor 208 can comprise any suitable type of pressure sensor, employing any suitable type of sensing principle (such as resistive, capacitive, piezoelectric, optical, micro electro-mechanical or MEMS, etc.). The pressure sensor 208 can be a barometric sensor, a piezo-resistive sensor, a microphone (such as a pressure microphone), etc.

Apparatus 200 further comprises means for determining 204 one or more characteristics of the signal. Means 204 may also be referred to as a first determining module 204. Apparatus 200 further comprises means for determining 206 a measure of a quality of a seal formed between the earpiece 106 (i.e. the ear tip 108, and optionally any other portions of the earpiece configured to contribute to forming a seal) and the ear canal 104 based on the one or more characteristics of the signal. Means 206 may also be referred to as a second determining module 206. In particular, apparatus 200 esti-mates the ear canal sealing quality by computing (or deter-mining) characteristics (or features) of the pressure signal while the user is wearing the earpiece 106 and outputs a measure of a quality of a seal, or seal quality measure (SQM). It will be understood that when the ear tip 108 is not inserted into the ear, the means for determining 206 a measure of a quality of a seal between the earpiece 106 and the ear canal 104 may still perform the determination, but based on the characteristic(s) it will be determined that no seal has been formed. The determining of a measure of seal quality is discussed below in more detail with reference to FIG. 3.

The examples described herein are capable of determining whether the ear canal 104 is sealed properly, rather than simply determining whether the earbud is positioned within the ear. A good quality seal with the ear canal is important to ensure good acoustic performance of earbuds and other earphones or earpieces when listening to music or during phone/video calls, for example. Active noise-cancelling algorithms also rely on a good seal to effectively reduce external noise. Moreover, in-ear microphones are increas-ingly being used for various sensing applications, such as: user authentication, monitoring of vital signs and/or body sounds, and human-computer interaction. Given the low amplitude of the acoustic signals under examination (e.g., heart beat), it can be challenging, if not impossible, to detect these signals through an earpiece 106 without a good seal with the ear canal 104.

The approach to determining a measure of a quality of a seal, or SQM, described herein can facilitate the determi-nation of the quality of a seal in a passive way, for example without relying on an active excitation signal. Moreover, the approach described herein can enable to check for a proper seal each time a user wears the earpiece 106, providing prompt feedback to the user when a good seal is not achieved. This approach is transparent for the user, who does not need to explicitly trigger a seal test or otherwise disrupt their use of the earpiece. The solution is also simpler to implement and more comfortable to the user than mechani-cal approaches to improving the quality of a seal by inflating a portion of the earpiece inside the user's ear canal, and can require minimal to no modification to existing earpieces.

As shown in FIG. 2A, apparatus 200 can be formed integral with the earpiece 106. In other words, the apparatus 200 is provided within the earpiece, and earpiece 106 comprises all the processors and memory required to imple-ment the means of apparatus 200. In other examples, such as shown in FIG. 2B, the apparatus 200 is provided independently of the earpiece, and is in communication with the earpiece 106 over connection 210, and/or over any other suitable connection. In such examples, apparatus 200 may be implemented in a standalone device in communication with the earpiece 106 (which could be a case, holder, or stand associated with the earpiece 106, for example), or may be integrated within another computing device. Said another computing device may be a mobile computing device (tablet, smartphone, laptop, etc.), or any other suitable computing device in communication with the earpiece 106 and associated with the user 100.

In some examples, apparatus 200 further comprises means for performing 212 an action in response to determining the measure of the quality of the seal. For example, the seal quality measure (SQM) can be used to provide feedback to the user about the status of the earpiece 106 and suggest a repositioning of the earpiece 106 or an ear tip replacement. Additionally or alternatively, the SQM can be used to perform another action. The action can comprise, for example, providing output to the user 100 via the earpiece 106, and/or enabling or disabling one or more features associated with operation of the earpiece 106 (e.g. noise cancelling or audio equalisation).

In this way, the determination of a measure of a quality of a seal between an earpiece and a user's ear can act as a proxy for determining whether or not the earpiece has been inserted into the user's ear at all, with the action being performed comprising starting/stopping music playback or activating/deactivating other functionalities of the earpiece and/or associated device(s). The use of the SQM as the basis for performing such actions can provide robust detection of 'wearing events' (detection of when the user inserts or wears the earpiece).

The action can also comprise authenticating the user 100. Authentication of a user 100 can be based on the measured quality of seal, since the pressure profile while inserting the earpiece 106 into the ear canal 104 (i.e. the change in signal over time, or the characteristics of the signal) depends on the specific conformation of the ear canal itself, which is unique to each user. The use of apparatus 200 to authenticate a user while wearing an earpiece 106 could enable certain features of the earpiece and/or associated device(s) only for registered users, for example, or provide an additional security layer when interacting with other associated devices, e.g., a smartphone.

In some examples, earpiece 106 can be associated with and/or in communication with a separate computing device (not shown), which separate computing device may include the apparatus 200 or be otherwise in communication with apparatus 200. The action may therefore comprise controlling the computing device to perform one or more actions (such as providing audio for output via the earpiece 106, or otherwise enabling/disabling output via the earpiece 106, or enabling/disabling noise cancelling or audio equalisation features), and/or controlling the computing device to allow access to features of the computing device by the user 100 based on the authentication. The action can also comprise controlling audio output and/or enabling/disabling features through the earpiece 106 directly, i.e. not via control of a computing device, which controlling of audio may also be based on the authentication of the user 100.

The functions of apparatus 200 will now be described in more detail with reference to FIG. 3A, FIG. 3B and FIG. 4.

Figure 3A:
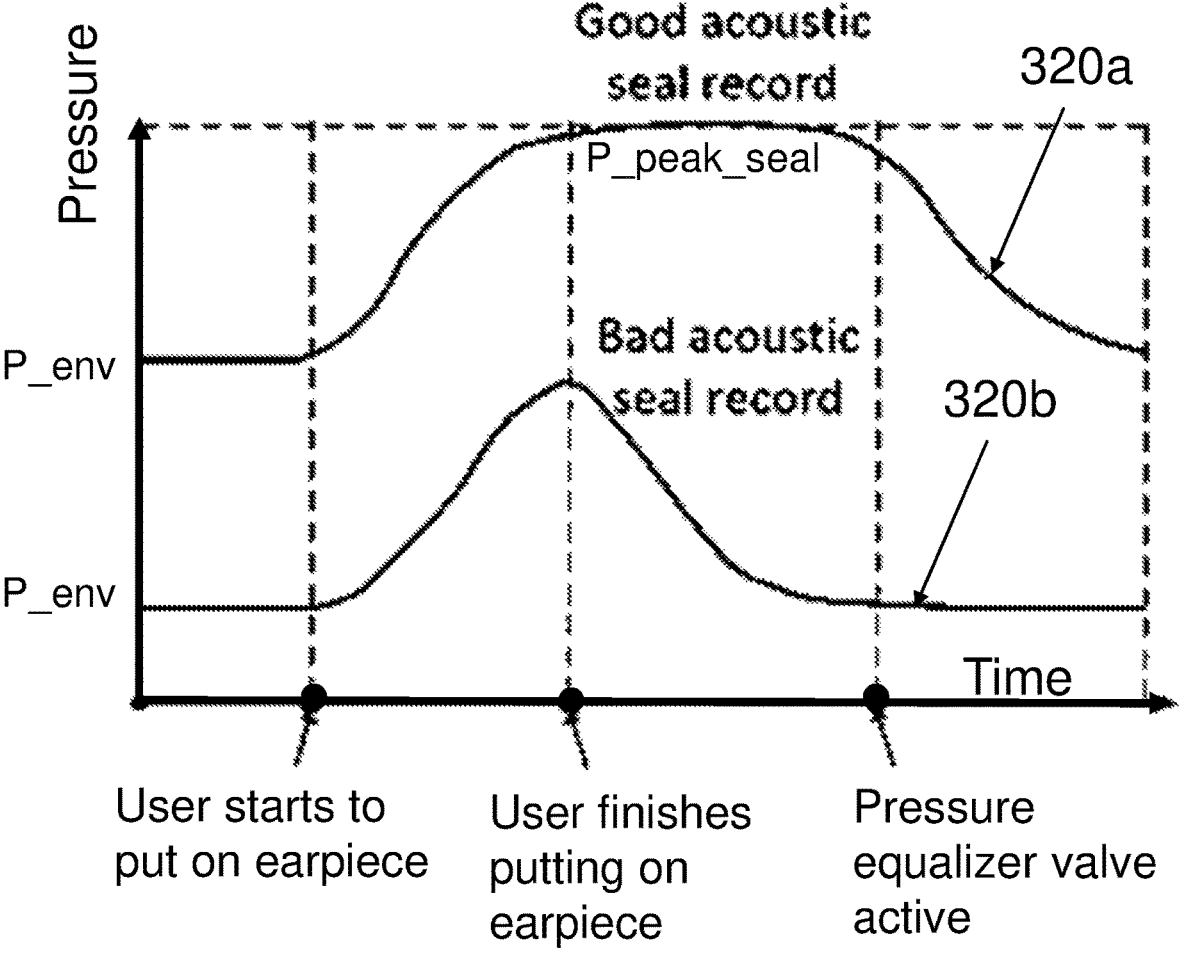
FIGS. 3A and 3B are schematic diagrams illustrating example pressure signals when an earpiece is inserted into an ear.

FIG. 3A illustrates an example change in pressure over time during insertion of an ear tip 108 of an earpiece 106 into an ear canal 104 of a user 100 when a good seal is formed (top line of graph, 320a) and when a poor seal is formed (bottom line of graph, 320b). These signal lines 320a, 320b are offset for ease of understanding, but it will be understood that the starting pressure for each example is the same (i.e. the ambient, environmental pressure P_env) and the two lines may be overlaid. The pressure inside the ear canal 104 can be measured by a pressure sensor (such as pressure sensor 208 described above), and lines 320a, 320b can be examples of a signal 320 indicative of a pressure measured by the pressure sensor.

Before the user puts on the earpiece, the pressure inside the ear canal 104 is typically the same as (or approximate to) the environmental pressure P_env. In other words, the pressure within the ear canal 104 can be equalized with the external environment. As the user 100 inserts the ear tip 108 of the earpiece into the ear canal (starts to put on earpiece), the measured pressure inside the ear canal 104 starts to increase. The pressure increases to a maximum value when the user has finished putting on the earpiece and the ear tip 108 is fully in place within the ear canal. The amount of pressure increase can be dependent on the speed and/or force with which the earpiece is put on (amongst other factors).

The characteristic(s) of the pressure signal 320 can be used to determine a quality of the seal which is formed with the ear canal 104. If a seal between the earpiece 106 (i.e. ear tip 108 and optionally with at least part of the rest of the earpiece 106, depending on the shape and configuration of the earpiece) and the ear canal 104 is good, the pressure inside the ear canal will stabilize at the higher/elevated pressure caused by the insertion or wearing event. In other words, if a perfect seal is formed, the pressure inside the ear canal will remain elevated at the maximum (peak) pressure of P_peak_seal. However, if a poor seal is formed, the pressure inside the ear canal will immediately begin to equalize with the environmental pressure P_env; in other words, the measured pressure will begin to decrease as soon as the user finishes putting on the earpiece, as shown in FIG. 3A (signal 320b). The rate at which the pressure within the ear canal 104 decreases can provide an indication of a quality of the seal which is formed.

In operation, signal 320 (indicative of a pressure measured by the pressure sensor 208) can be received by means 202 of apparatus 200. One or more characteristics of the signal 320a can be determined by the means for determining 204 using any suitable signal processing techniques. These determined characteristics can include: a maximum value of the signal (i.e. a peak measured pressure); a gradient or steepness of the signal over one or more portions of the period of time (for example, the rate at which the pressure within the ear canal 104 increases to a peak value P_peak_seal and/or decreases back to P_env subsequent to reaching a maximum value); a ratio between the maximum value and an external reference signal (optionally, the external reference signal being the environmental pressure P_env); a standard deviation of the signal; a variance of the signal; and/or a minimum value of the signal. Other characteristics may also be determined, as appropriate to a particular use case or application.

These characteristics are computationally simple values, which can be determined or computed using known signal processing techniques and with potentially limited computational and battery resources of the earpiece 106 (when the apparatus 200 is integral with the earpiece). In other examples where apparatus 200 is separate from the earpiece, it will be understood that more computationally intensive characteristics may be used, and more complex signal processing techniques may be used. The pressure signal 320 may also be filtered or smoothed using any known processing techniques before determining the one or more features or characteristics.

Based on the determined characteristic(s), a measure of a quality of a seal between the ear tip 108 and the ear canal 104 can be determined by the means for determining 206 of the apparatus 200. The characteristics can be used in any suitable combination for determining the measure of seal quality.

In some particular examples, the measure of a quality of a seal (or SQM) is determined based on a combination of: a measurement of an external, ambient, pressure; a rise or increase in pressure from the ambient level; and a gradient of the pressure signal after the peak pressure value is reached. In other words, detection of a sudden/rapid increase in pressure within the ear canal 104 to at least a predetermined level above the ambient pressure, P_env, and then detection that the pressure remains elevated and doesn't rapidly fall off to P_env, can be an indication of formation of a good seal. The ambient pressure external to the ear canal P_env can be measured by the pressure sensor 208 prior to insertion of the earpiece 106 into the ear, or by any other additional pressure sensor. In other examples, one or more other characteristics may be used as well as or instead of these particular features/characteristics.

In some examples, apparatus 200 further comprises means for weighting each of the one or more characteristics. The means for determining 206 the measure of the quality of the seal further comprises means for determining the measure of the quality of the seal based on the weighted one or more characteristics. For example, each (1 . . . n) characteristic or feature (F) of the signal 320 will be assigned a corresponding weight ($\mu_n$). In one example, the means for determining 206 can then compute the SQM as $$\sum_{i=1}^{n} \mu_n F_n.$$

The SQM may also be calculated/computed using the weight(s) in any suitable manner and/or using any suitable technique or formula. In other words, the characteristics/features can be (optionally weighted) and combined using any one of a range of different approaches. The weights can be selected to adjust the relative importance of certain characteristics, and/or normalise the SQM to provide comparative SQM values. Any suitable selection of weights can be used, and the selection of the weights may be based on the particular application or use case of the SQM.

In some examples, the weights $\mu_n$ are adjusted so that the final SQM value is normalised within the range 0 to 100. In this arrangement, where the means for determining 206 perform the SQM determination without a seal being formed, the SQM may equal 0, or another low value. For a perfect seal, the SQM may equal 100. Where the range for the SQM is 0 to 100, a good seal may correspond to an SQM>=a first predetermined threshold value (e.g. 70, 80, 90), and a bad seal may correspond to an SQM<=a second predetermined threshold value (e.g. 40, 30, 20). An average seal may correspond to an SQM between the first and second threshold values. Different threshold values can be used for different weightings/normalisation of the SQM, as appropriate.

It will be understood that different actions can be taken by means 212 depending on the quality of the seal measured by apparatus 200. For example, a poor quality seal represented by the SQM satisfying a first criteria (such as, for example, being less than or less than or equal to a first predetermined threshold value) may prompt output to a user regarding the status of the earpiece 106 and suggesting a repositioning of the earpiece 106 or an ear tip replacement. Similarly, a poor seal may cause the apparatus 200 to deactivate/disable certain functionalities (such as noise cancelling or audio equalisation) or stop playback of audio. A good quality seal represented by the SQM satisfying a second criteria (such as, for example, being greater than or greater than or equal to a second predetermined threshold value higher than the first predetermined threshold value) may instead cause the apparatus 200 to activate/enable one or more features or functionalities associated with the earpiece.

Figure 3B:
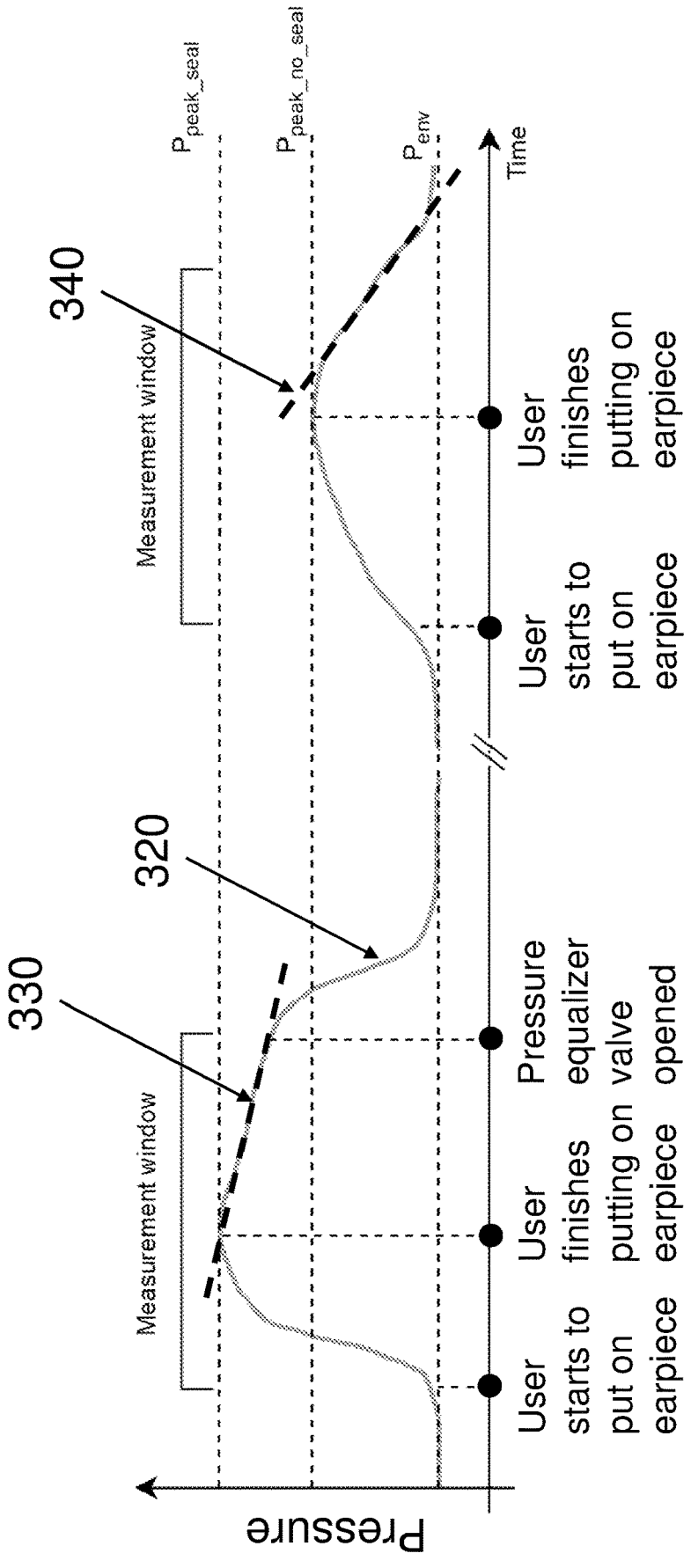

The determination of a measure of seal quality is illustrated further in FIG. 3B, which shows a change in a pressure signal 320 over time. In the left hand case (first measurement window over a first time period), the pressure signal 320 raises quickly from the ambient pressure P_env and reaches a peak value P_peak_seal. The pressure signal 320 drops off from the peak value relatively slowly (shallow gradient, 330), which is indicative of a good seal with the ear canal 104. These features of the pressure signal can be captured by the determined characteristics mentioned above while the user is wearing the earpiece. A good seal is formed. In contrast, in the right hand case (second measurement window over a second time period), the ear canal is not properly sealed with the earpiece 106. The pressure rises from the ambient pressure P_env, but only to a maximum value P_peak_no_seal less than maximum value P_peak_seal of the first measurement window. The pressure signal then also drops back to the ambient pressure P_env quicker than with the first measurement window (see the gradient, 340, which is steeper than gradient 330). A poor seal is formed.

Figure 4:
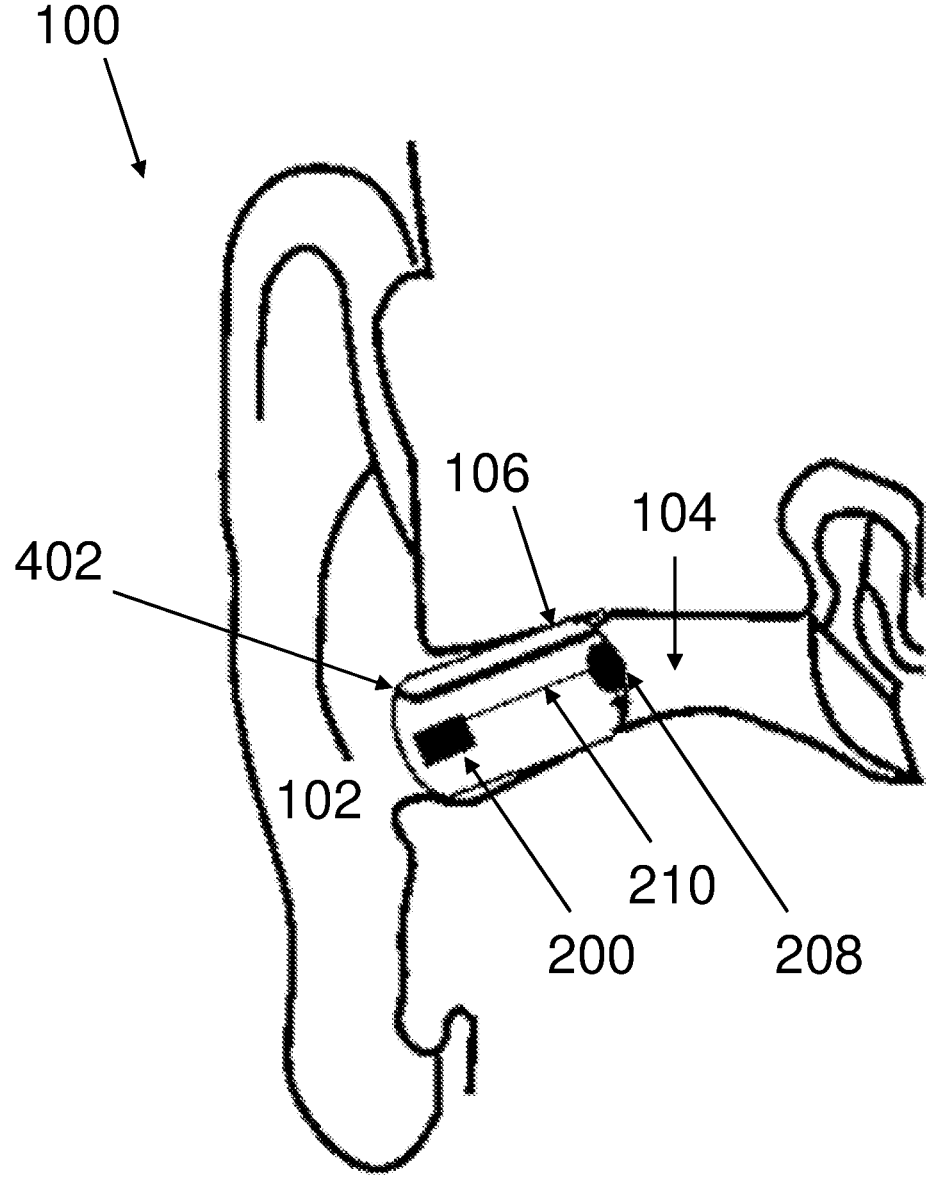
FIG. 4 is a schematic of an example earpiece as described herein inserted into an ear of a user.

With reference to FIG. 4, an example earpiece 106 is shown comprising pressure sensor 208 facing towards the ear canal 104, and an integral apparatus 200. Pressure sensor 208 is here located inside the ear tip of the earpiece 106. Apparatus 200 may be implemented as part of a controller or processor of earpiece 200, such as an MCU. The pressure sensor is connected to the apparatus 200 via connection 210. In examples where apparatus 200 is not integral with the earpiece, the pressure sensor may instead be coupled to a controller/processor over connection 210. The controller/processor can be configured to sample the pressure sensor and provide the signal 320 to the external apparatus 200 over one or more wireless/wired connections (not shown).

An optional pressure equalizer valve 402 is also provided within earpiece 106. The ear canal 104 and the external environment of the user 100 can be connected via a passage (represented by a black line in FIG. 4). The passage is controlled by valve 402, which valve allows to adjust or release the pressure within the ear canal. Valve 402 is here shown at the end of the passage at the external end of earpiece 106 (i.e. the end opposite the ear tip), but the valve can be positioned at any suitable location along the passage.

In some examples, where a good seal is formed and a pressure equalizer valve 402 is provided, the apparatus 200 may be configured to open the valve 402 to reduce the pressure within the ear canal 104. This can help to reduce or avoid user discomfort caused by the elevated pressure within the ear canal 104 during use of the earpiece 106. In particular, the apparatus 200 may further comprise means for controlling opening of a pressure equalizer valve 402 of the earpiece 106. The controlling can be based on the measure of the quality of the seal satisfying one or more predetermined criteria (such as being above a threshold indicative of a good seal quality, for example).

For example, when the SQM is greater than, or greater than or equal to, a predetermined threshold value indicative of a successful seal between the ear tip and the ear canal, the valve may be opened. In other words, the apparatus 200 controls the valve 402 to remain closed until the measurements and computations required to determine the SQM have been completed. If the valve is not controlled to remain closed in this way, it may not be possible to measure the quality of the seal since the pressure may equalize with the environment via the valve and no rise in pressure will be seen when the ear tip 108 is inserted. This is in contrast to normal relief valves, which are configured to equalize the pressure quickly.

The apparatus can further comprise means for controlling the valve pressure equalizer valve to adjust a pressure within the ear canal. The valve can be configured to reduce the pressure to a level which avoids user discomfort whilst the earpiece 106 is in use. When the valve 402 is opened, the valve can be opened to equalize the pressure between the ear canal and the external environment (as is shown in FIGS. 3A and 3B). In other words, after the seal has been tested, the pressure inside the ear canal can be reduced back to the ambient pressure by way of the valve 402. Alternatively, the means for controlling the pressure equalizer valve to adjust pressure within the ear canal can comprise means for controlling the pressure equalizer valve 402 to adjust pressure within the ear canal to a target pressure P_target greater than an ambient environmental pressure P_env. This alternative approach can facilitate monitoring of the seal quality over time, as discussed in more detail below with reference to FIG. 5.

In some examples, valve 402 can act to passively release the pressure within the ear canal. For example, the valve can be a pressure relief valve configured to open at a set pressure (i.e. when a pressure difference with the environment is above a predetermined amount). Such a passive valve can be spring operated, or may comprise a diaphragm in place of a spring. Alternatively, any other biasing member (optionally formed of rubber) may be used to keep the valve 402 closed unless the pressure within the ear canal is at or above the set pressure. In other words, after the apparatus controlling opening of the valve allows the valve to open, the means or mechanism by which the valve actually opens may be passive. In other examples, the means for controlling the valve 402 can comprise a controller configured to actively control the pressure within the ear canal 104 by actively controlling opening/closing of the valve. The controller may form part of apparatus 200, or may be a functionally separate controller integrated into the valve, for example.

Figure 5:
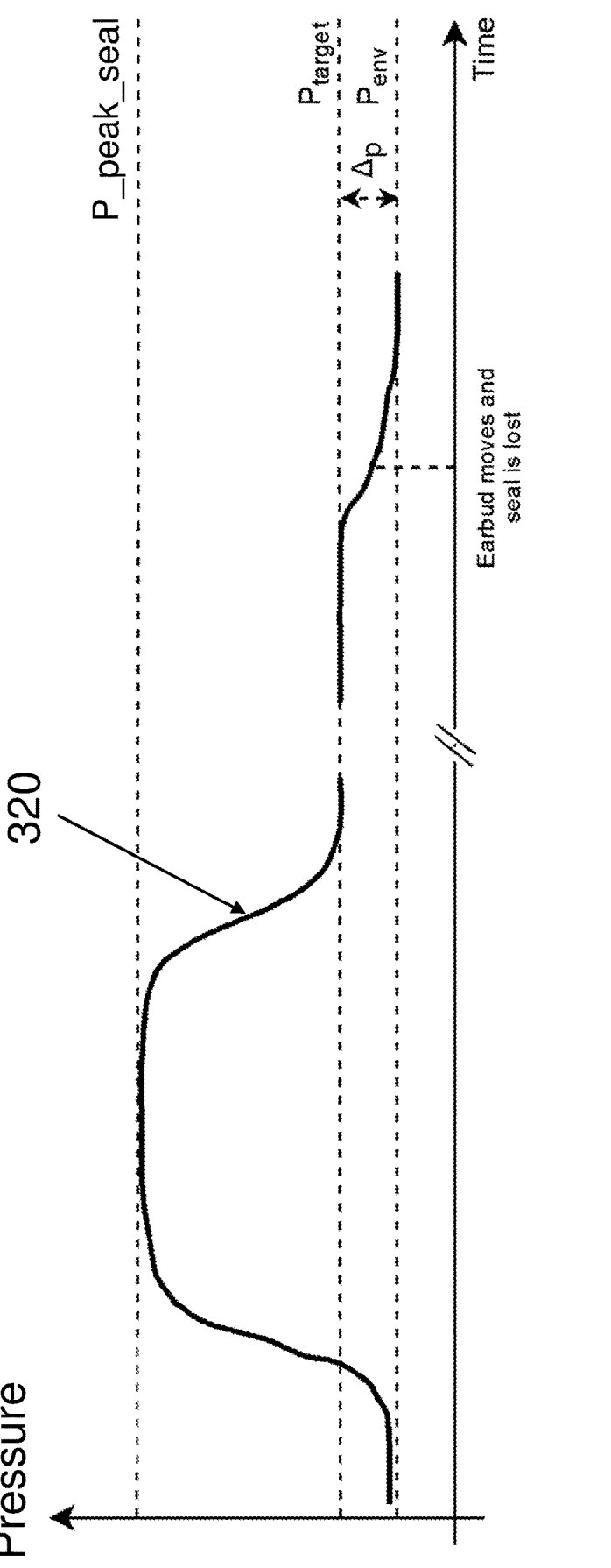
FIG. 5 is a schematic diagram illustrating an example pressure signal when monitoring a seal between an earpiece and an ear.

With reference to FIG. 5, monitoring of the seal between the ear tip 108 of the earpiece and the ear canal 104 using the pressure signal 320 is described. In particular, once a seal has been established (i.e. the SQM satisfies one or more criteria indicative of a good seal), the pressure sensor 208 located within the earpiece 106 can also be used to detect when the sealing quality is lost. Determination of ongoing seal quality can be performed by periodically receiving, at apparatus 200, a signal from the pressure sensor (optionally at a low rate, such as 1 Hz, 2 Hz, 5 Hz, etc.) and detecting changes in the pressure level within the ear canal 104 from that signal.

Such monitoring of the seal can be performed in the same way as the initial determination of the measure of the quality of the seal (i.e. based on determining one or more characteristics of the signal 320 from the pressure sensor 208).

Alternatively, in implementations where a pressure relief valve 402 is provided, the target pressure P_target can be used for such monitoring instead.

When a good seal is detected/determined, the apparatus 200 can control opening of the valve 402 to allow the valve to open. The valve can then (in some implementations) actively or passively reduce the pressure within the ear canal from the peak pressure P_peak_seal to a target pressure P_target, which is slightly higher than the external, ambient, pressure P_env. If the seal between the earpiece 106 and the ear canal 104 is lost due to movement of the earpiece 106, the apparatus 200 can detect the loss of the seal since an abrupt reduction in pressure from P_target to P_env will be detected through periodic reading/sampling the pressure sensor 208 (or otherwise periodically receiving signals from the pressure sensor). FIG. 5 depicts such an example change in pressure signal over time when a seal is lost.

The pressure P_target should not be so high so as to be uncomfortable during prolonged use of the earpiece by a user, but should be high enough that a drop in the pressure is detectable if the seal is broken. In other words, the difference in the ambient pressure and target pressure ($\Delta p = P\_target - P\_env$) is preferably selected (or predetermined) in order that the difference is greater than any expected 'normal' fluctuations in the pressure within the ear canal 104 (due to the user chewing, talking, etc.).

Where an active valve 402 is provided, the pressure P_target may be calculated or determined on the fly, or on a per user basis. For example, the desired pressure within the ear canal 104 may be different for each user, and may be dependent on the shape and/or size of a user's ear canal. The desired pressure P_target may also depend on the activities being performed by a user at a given time. The controller of the valve 402 can be configured to determine the P_target based on the environmental pressure, and one of more of these factors. When valve 402 is a passive valve, the set pressure at which the passive valve opens may be selected to be a predetermined pressure, which may approximate the expected P_target or P_env, for example. The set pressure may be selected in order to provide a $\Delta p$ expected to be functional for most user cases. Use of such a passive valve can facilitate the rapid, cost effective, manufacture of earpieces 106. The functions of apparatus 200 will now be described in more detail with reference to FIG. 6A and FIG. 6B.

As discussed above, apparatus 200 comprises means for receiving 202 over a period of time, a signal 320 indicative of a pressure measured by a pressure sensor 208 of an earpiece 106. In other words, the pressure sensor can be read/sampled over the period of time (602). The period of time can be a predetermined period of time, optionally configured to correspond to a period of time over which a user typically inserts an earpiece. For example, the period of time can be 3 seconds, 4 seconds, 5 seconds, etc. Any suitable period of time can be used.

The means for receiving can comprise means for receiving the signal from the pressure sensor at a predetermined sampling rate over the period of time. For example, the apparatus, or an intermediary component such as an MCU, can be configured to sample the pressure sensor 208 at a predetermined sampling rate or frequency to obtain the signal 320. For example, the sampling rate can be 5 Hz, 10 Hz, 20 Hz, etc. Any suitable sampling rate can be used. This example is shown in the flowcharts of FIG. 6A and FIG. 6B.

In other examples, where the pressure sensor 208 is independently powered and no external voltage is required to read from the sensor (such as with a piezoelectric pressure sensor), the means for receiving can comprise means for receiving the signal from the pressure sensor continuously over the period of time. For example, the apparatus 200 can read from the pressure sensor 208 (directly or via the intermediary component) continuously over the period of time to obtain the signal 320.

Figures 6A, 6B:
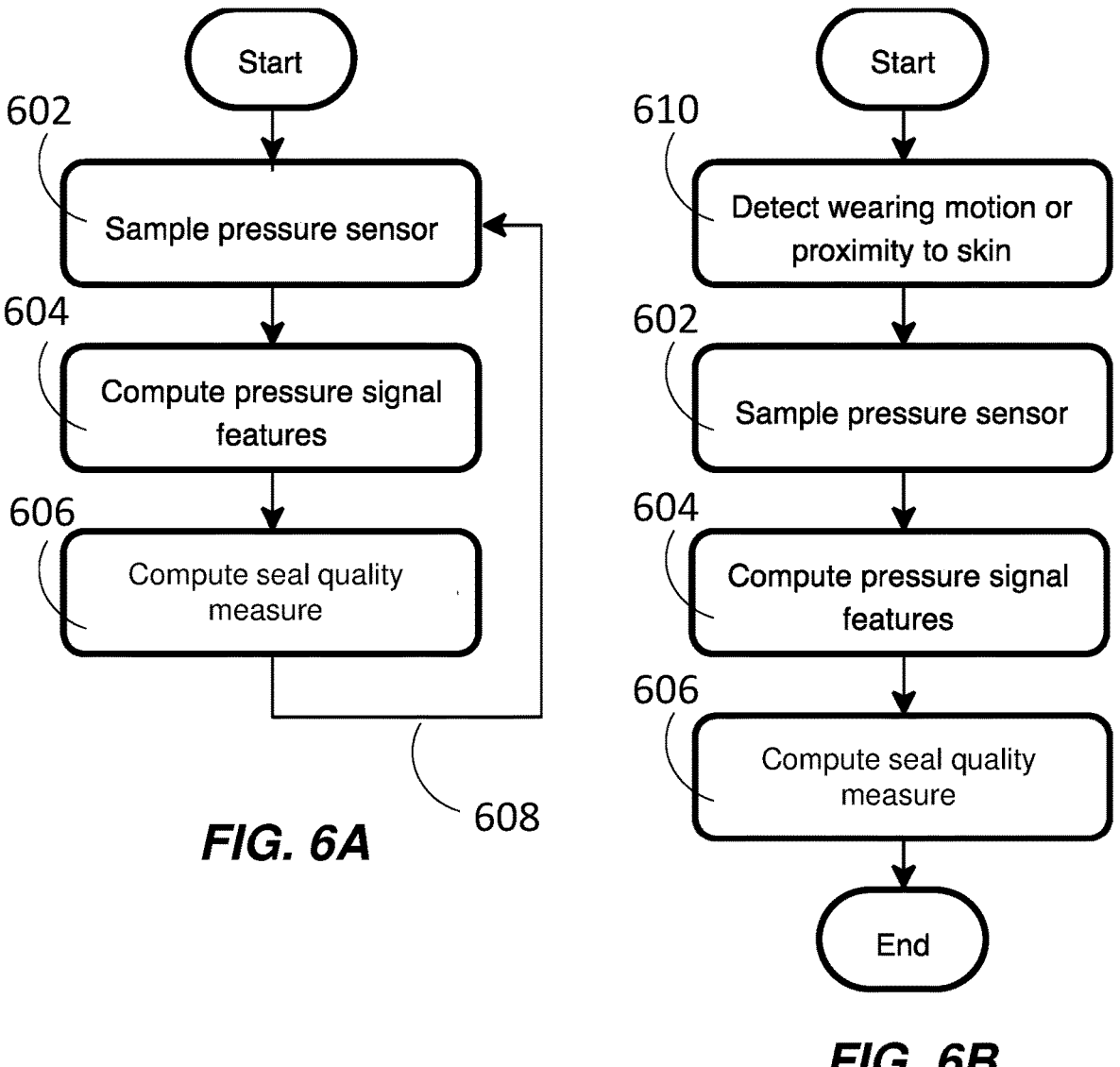
FIGS. 6A and 6B are example flow diagrams showing processing operations according to some examples of determining a seal quality.

With reference to FIG. 6A, after the pressure sensor is read/sampled, the apparatus 200 can compute features or characteristics of the pressure signal 320 (604). In other words, the means for determining one or more characteristics of the signal can compute/determine the characteristic(s) of the signal. Based on these characteristics, the apparatus can compute the seal quality measure, SQM (606). In other words, the means for determining a measure of a quality of a seal between the ear tip and the ear canal can compute/determine the SQM based on the one or more characteristics of the pressure signal 320.

These operations can be periodically repeated (608) by apparatus 200, as shown in FIG. 6A. In other words, the apparatus 200 can periodically sample/read the pressure sensor 208 for a certain period of time or time interval (e.g., 3, 4, 5 seconds), determine the characteristics or features of the pressure signal 320, and then determine the SQM. In such an arrangement, apparatus 200 may further comprise means for periodically receiving an updated signal from the pressure sensor, and means for updating the measure of the quality of the seal based on the updated signal. In other words, each iteration of FIG. 6A provides an updated signal 320 from the pressure sensor and facilitates an updating of the measured SQM to reflect a current seal quality. The updated SQM can be stored, and/or can be used by means 212 as the basis for which to perform one or more actions. In other words, the means for performing 212 an action in response to determining the measure of the quality of the seal can comprise means for performing 212 an action in response to determining the updated measure of the quality of the seal.

In implementations where no valve 402 is provided (or where the pressure within the ear canal is not adjusted or equalized by means of valve 402), this periodic updating of the SQM can be advantageous for monitoring the quality of the seal over time. However, in instances where no seal has yet been formed (for example because the earpiece is not inserted into the ear 102 of the user 100), such a periodic determination/calculation of the SQM could have a negative impact on the battery life of the device comprising the apparatus 200 and/or of the earpiece 106. Therefore, in some examples, a trigger event can be used to initiate the steps of FIG. 6A, such that the apparatus 200 only initiates the determination of the SQM when a user 100 is expected to be inserting the earpiece 106 into their ear 102.

Such an arrangement is discussed further with reference to FIG. 6B. In this example, apparatus 200 further comprises means for determining a trigger event indicative of an initiation of insertion of the ear tip 108 into the ear canal 104. The trigger event is determined based on a second signal from a second sensor associated with the earpiece 106. Instead of periodically determining the SQM, as in FIG. 6A, the determination is initiated (610) in response to the trigger event (and thus based on the second signal from the second sensor).

The second sensor can be part of the earpiece 106, or may be part of a standalone device (such as a case, holder, or stand of the earpiece). The second sensor can comprise an IMU and/or a proximity sensor. For example, a proximity sensor can be used within a case/holder of an earpiece 106 to determine when the case/holder is opened, or when an earpiece is removed from a stand. In other examples, an IMU may be integrated with the case/holder/stand to detect movement indicative of a removal of the earpiece. In other examples, an IMU may be integrated with the earpiece to detect movement of the earpiece itself and/or a proximity sensor may be integrated with the earpiece to detect proximity of the earpiece to a user. Any suitable sensor associated with the earpiece 106 may be used as the second sensor to facilitate determination of a trigger event indicative of an initiation of insertion of the ear tip 108 into the ear canal 104.

The second signal can be indicative of an output from the second sensor over time. The means for determining a trigger event can comprise means for determining that the second signal is indicative of a user inserting the earpiece 106 into the ear canal 104, or of a user initiating the action of inserting the earpiece. For example, the trigger event can comprise determining (610) that the second signal is indicative of a wearing motion (putting the earpiece on), or of a proximity to skin of a user. In some examples, the trigger event can be determined based on a matching of the second signal to one or more predefined signal patterns indicative of an initiation of insertion of the earpiece into the ear.

The means for receiving 202 of apparatus 200 can thus comprise means for receiving the signal 320 from the pressure sensor 208 in response to determining the trigger event has occurred. In other words, the pressure sensor may only be sampled/read by the apparatus (or the apparatus may only receive the signal 320 from an intermediary component) once the start of an insertion event (trigger event) is detected (610). In this way, the second sensor (optionally the IMU and/or proximity sensor) can be used as a first determination stage/step to detect if the user is beginning to wear the earpiece and trigger the sampling of the pressure sensor 208. The trigger event may be determined on the earpiece 106, or on a different computing device. Depending on the particular configuration of the second sensor, operation 610 may be repeated periodically until a trigger event is detected and operation 602 is performed.

It will be understood that any such trigger event may be a false positive, and that the apparatus 200 may therefore in some instances unnecessarily perform a determination of the SQM in response to such a false trigger event. Nevertheless, operation 610 may generally avoid (or reduce a frequency of) performance of operation 602 when an earpiece 106 is not in use. An impact on battery life may be reduced as compared to the approach of FIG. 6A by introducing this two-step process for determining the measure of a quality of a seal.

After determining the SQM in accordance with operation 606 of FIG. 6B, the apparatus 200 may be configured to reduce the pressure within the ear canal 104 by way of a pressure relief valve 402, as discussed above with respect to FIG. 5. Alternatively, the pressure within the ear canal may be maintained and a periodic determination of the SQM may be performed by apparatus 200, in accordance with operation 608 of FIG. 6A.

An advantage of the examples described herein are that they do not make use of the speaker of the earphone. Use of the speaker to generate tones can be distracting and uncomfortable for the user, and lead to increased power consumption. The use of microphones also increases power consumption, for example the use of active microphones to monitor an excitation signal from the speaker can draw around 600 μA of current.

The examples described, objectively and unobtrusively determine the quality of an earpiece seal with an ear canal in a simple, repeatable, way, and without active user initiation.

Example Apparatus

Figure 7:
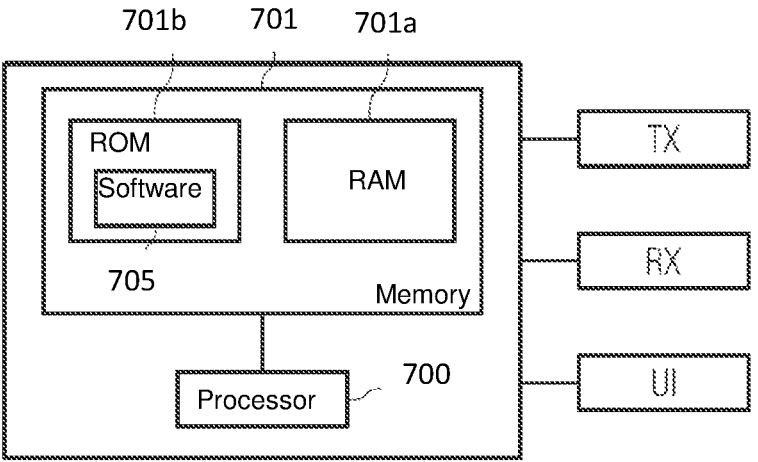
FIG. 7 is a schematic view of an apparatus which may be configured according to one or more example implementations of the process described herein.

FIG. 7 shows an apparatus according to some example embodiments, which may comprise the apparatus 200. The apparatus may be configured to perform the operations described herein, for example operations described with reference to any disclosed process. The apparatus comprises at least one processor 700 and at least one memory 701 directly or closely connected to the processor.

The memory 701 includes at least one random access memory (RAM) 701a and at least one read-only memory (ROM) 701b. Computer program code (software) 705 is stored in the ROM 701b. The apparatus may be connected to a transmitter (TX) and a receiver (RX). The apparatus may, optionally, be connected with a user interface (UI) for instructing the apparatus and/or for outputting data. The at least one processor 700, with the at least one memory 701 and the computer program code 705 are arranged to cause the apparatus to at least perform at least the method according to any preceding process, for example as disclosed in relation to the flow diagrams of FIG. 6A and FIG. 6B and related features thereof.

Figure 8:
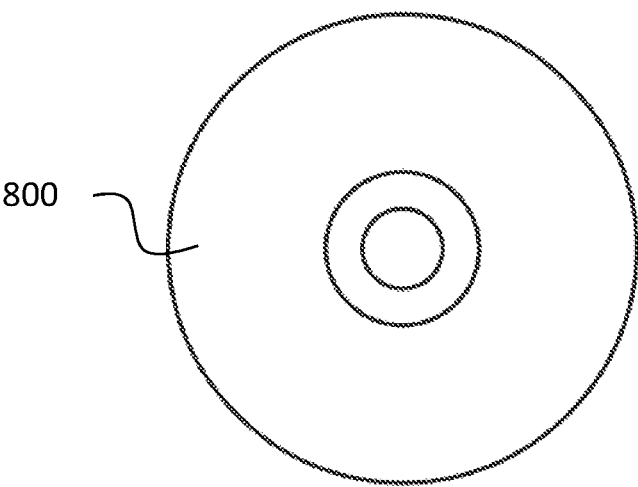
FIG. 8 is a plan view of non-transitory media.

FIG. 8 shows a non-transitory media 800 according to some embodiments. The non-transitory media 800 is a computer readable storage medium. It may be e.g. a CD, a DVD, a USB stick, a blue ray disk, etc. The non-transitory media 800 stores computer program code, causing an apparatus to perform the method of any preceding process for example as disclosed in relation to the flow diagrams and related features thereof.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:

at least one processor; and at least one memory storing instructions that, when executed by the at least one processor, causes the apparatus to:

receive, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal, and wherein the signal is indicative of a pressure increase within the ear canal resulting from the ear tip being inserted into the ear canal;

determine one or more characteristics of the signal; and determine a measure of a quality of a seal between the earpiece and the ear canal based on the one or more characteristics, wherein the signal is indicative of at least one of (i) a pressure in the ear canal measured during insertion of the ear tip into the ear canal or (ii) a pressure in the ear canal measured without relying on an active excitation signal.

2. The apparatus of claim 1, wherein the receiving of the signal from the pressure sensor comprises:

receive the signal from the pressure sensor at a predetermined sampling rate over the period of time; or receive the signal from the pressure sensor continuously over the period of time.

3. The apparatus of claim 1, wherein the one or more characteristics comprise at least one of: a maximum value of the signal, a gradient of the signal over one or more portions of the period of time, a ratio between the maximum value and an external reference signal, a standard deviation of the signal, a variance of the signal, or a minimum value of the signal.

4. The apparatus of claim 3, wherein the one or more characteristics comprises a ratio between a maximum value of the signal and an external reference signal, the external reference signal comprising an ambient pressure measured by the pressure sensor prior to insertion of the ear tip into the ear canal.

5. The apparatus of claim 3, wherein the one or more characteristics comprise a gradient of the signal over one or more portions of the period of time.

6. The apparatus of claim 1, wherein the instructions, when executed by the at least one processor, further causes the apparatus to:

weight each of the one or more characteristics, wherein the determining of the measure of the quality of the seal further comprises: determine the measure of the quality of the seal based on the weighted one or more characteristics.

7. The apparatus of claim 1, wherein the instructions, when executed by the at least one processor, further causes the apparatus to:

control opening of a pressure equalizer valve of the earpiece, wherein the control is based on the measure of the quality of the seal satisfying one or more predetermined criteria.

8. The apparatus of claim 7, wherein the instructions, when executed by the at least one processor, further causes the apparatus to:

control the pressure equalizer valve to adjust pressure within the ear canal to a target pressure greater than an ambient environmental pressure.

9. The apparatus of claim 1, wherein the instructions, when executed by the at least one processor, further causes the apparatus to:

periodically receive an updated signal from the pressure sensor; and update the measure of the quality of the seal based on the updated signal.

10. The apparatus of claim 1, wherein the instructions, when executed by the at least one processor, further causes the apparatus to:

determine a trigger event indicative of an initiation of the insertion of the ear tip into the ear canal, the trigger event determined based on a second signal from a second sensor associated with the earpiece, wherein the receive of the signal from the pressure sensor further comprises receive of the signal from the pressure sensor in response to determining the trigger event.

11. The apparatus of claim 10, wherein the second sensor comprises an IMU and/or a proximity sensor.

12. The apparatus of claim 1, wherein the instructions, when executed by the at least one processor, further causes the apparatus to:

perform an action in response to the determining of the measure of the quality of the seal, the action comprising one or more of: provide output to the user via the earpiece; enable or disabling one or more features associated with operation of the earpiece; or authenticate the user.

13. An earpiece comprising an ear tip configured for insertion into an ear canal of a user, the earpiece further comprising:

the pressure sensor; and the apparatus of claim 1.

14. A method comprising:

receiving, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal, and wherein the signal is indicative of a pressure increase within the ear canal resulting from the ear tip being inserted into the ear canal;

determining one or more characteristics of the signal over the period of time; and determining a measure of a quality of a seal between the earpiece and the ear canal based on the one or more characteristics, wherein the signal is indicative of at least one of (i) a pressure in the ear canal measured during insertion of the ear tip into the ear canal or (ii) a pressure in the ear canal measured without relying on an active excitation signal.

15. The method of claim 14, wherein the one or more characteristics comprise a gradient of the signal over one or more portions of the period of time.

16. A non-transitory computer readable medium comprising instructions for causing an apparatus to perform at least:

receiving, over a period of time, a signal indicative of a pressure measured by a pressure sensor of an earpiece, the earpiece comprising an ear tip configured for insertion into an ear canal of a user, wherein the pressure sensor is arranged to measure a pressure within the ear canal whilst the ear tip is inserted into the ear canal, and wherein the signal is indicative of a pressure increase within the ear canal resulting from the ear tip being inserted into the ear canal;

determining one or more characteristics of the signal over the period of time; and determining a measure of a quality of a seal between the earpiece and the ear canal based on the one or more characteristics, wherein the signal is indicative of at least one of (i) a pressure in the ear canal measured during insertion of the ear tip into the ear canal or (ii) a pressure in the ear canal measured without relying on an active excitation signal.

* * * * *